(12) United States Patent  
Herron (10) Patent No.: US 7,545,828 B2  
(45) Date of Patent: Jun. 9, 2009

(54) EFFICIENT AAL5-BASED MECHANISM FOR HANDLING VOICE ATM CELLS TO SIGNIFICANTLY REDUCE CPU LOAD

(75) Inventor: Phillip Stone Herron, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 980 days.

(21) Appl. No.: 10/408,590

(22) Filed: Apr. 7, 2003

(65) Prior Publication Data

US 2003/0235199 A1 Dec. 25, 2003

Related U.S. Application Data

(63) Continuation-in-part of application No. 10/262,402, filed on Oct. 1, 2002.

(60) Provisional application No. 60/390,337, filed on Jun. 21, 2002.

(51) Int. Cl.
*H04J 3/22* (2006.01)

(52) U.S. Cl. .............. 370/466; 370/419; 370/538; 370/545

(58) Field of Classification Search .............. 370/498, 370/508, 419, 463, 545, 321, 326, 347, 442, 370/458, 337, 466–467; 709/250
See application file for complete search history.

(56) References Cited

U.S. PATENT DOCUMENTS 5,999,533 A * 12/1999 Peres et al. .............. 370/395.4
6,154,465 A * 11/2000 Pickett .................... 370/466
6,181,697 B1 * 1/2001 Nurenberg et al. ........ 370/390
6,208,658 B1 * 3/2001 Pickett .................... 370/401
7,012,924 B1 * 3/2006 Storck .................... 370/395.7
7,050,428 B1 * 5/2006 Dove et al. ................ 370/376
2007/0036150 A1 * 2/2007 Pounds et al. ............. 370/352

OTHER PUBLICATIONS

The ATM Forum Technical Committee, Utopia Level 2, Version 1.0, af-phy-0039.00, Jun. 1995.
International Telecommunication Union, ITU-T I.432.3 (Feb. 1999) Series I: Integrated Services Digital Network, B-ISDN user-network interface-Physical layer specification: 1544 kbit/s and 2048 kbits operation.

* cited by examiner

*Primary Examiner*—Hassan Kizou
*Assistant Examiner*—Mounir Moutaouakil
(74) *Attorney, Agent, or Firm*—Allen, Dyer, Doppelt, Milbrath & Gilchrist, P.A.

(57) ABSTRACT

A mechanism for implementing a single-interrupt-based voice playout buffer transfer operation. The contents of each respective channel of a multi-channel voice playout buffer are encapsulated so as to prepend a four byte ATM header, a HEC byte, and a four byte AAL2 header to a forty-four byte voice channel field to realize a standard fifty-three byte ATM cell. Within the AAL2 header, a channel identification byte (CID) provides selective mapping to timeslots of a TDM frame, to accommodate variations among different vendor equipments. The next to last bit of the last byte of the ATM header is used as an interrupt to the network processor. Only the highest voice channel asserts this next to last bit as an interrupt bit.

18 Claims, 3 Drawing Sheets

EFFICIENT AAL5-BASED MECHANISM FOR HANDLING VOICE ATM CELLS TO SIGNIFICANTLY REDUCE CPU LOAD

CROSS-REFERENCE TO RELATED APPLICATION

The present application is a continuation-in-part of co-pending U.S. patent application Ser. No. 10/262,402, filed Oct. 1, 2002, by Paul McElroy et al, entitled: "Dual-PHY Based Integrated Access Device" (hereinafter referred to as the '402 application), and claims the benefit of co-pending Provisional U.S. patent application Ser. No. 60/390,337, filed Jun. 21, 2002, entitled: "Highly Integrated Dual-PHY Voice Co-Processor," by P. McElroy, each application assigned to the assignee of the present application and the disclosures of which are incorporated herein.

FIELD OF THE INVENTION

The present invention relates in general to telecommunication systems and subsystems therefor, and is particularly directed to a single interrupt-based mechanism for efficiently interfacing multiple channels of asynchronous transfer mode (ATM)-formatted digitized voice cells between a multi-channel voice cell buffer and the communications controller of an integrated access device (IAD) platform. The invention has particular utility in an IAD platform of the type disclosed in the above-referenced '402 application, which employs a highly integrated, time division multiplexed (TDM), asynchronous transfer mode (ATM) cell based architecture, for providing enhanced interfacing flexibility for multiple and diverse signaling protocols, that substantially reduces costs and constraints as to choice of host processor used in conventional digital signal processor (DSP)-based IADs.

BACKGROUND OF THE INVENTION

As described in the above-referenced '402 application, to accommodate voice and data signaling requirements of various communication service providers and their customers, manufacturers of digital communication equipment currently offer integrated access devices (IADs). These devices allow a user to interface multiple types of digital voice and data signaling circuits with a (wide area) communication network. Unfortunately, conventional IAD designs have been constrained by the lack or limited availability of reasonably priced and versatile communication control processors. A fundamental shortcoming of these conventional controller chips is the fact that they are digital signal processor (DSP)-based, consume large amounts of power, and are procurable from essentially one semiconductor fabrication source. Being DSP-based also means that the functionality of an IAD using such control chips is heavily dependent on embedded software. In addition, these chips have only a small number voice and data interface ports, which are typically permanently dedicated to specified signaling modes, thereby limiting their flexibility and efficiency in the face of dynamic signaling requirements.

Figure 1:
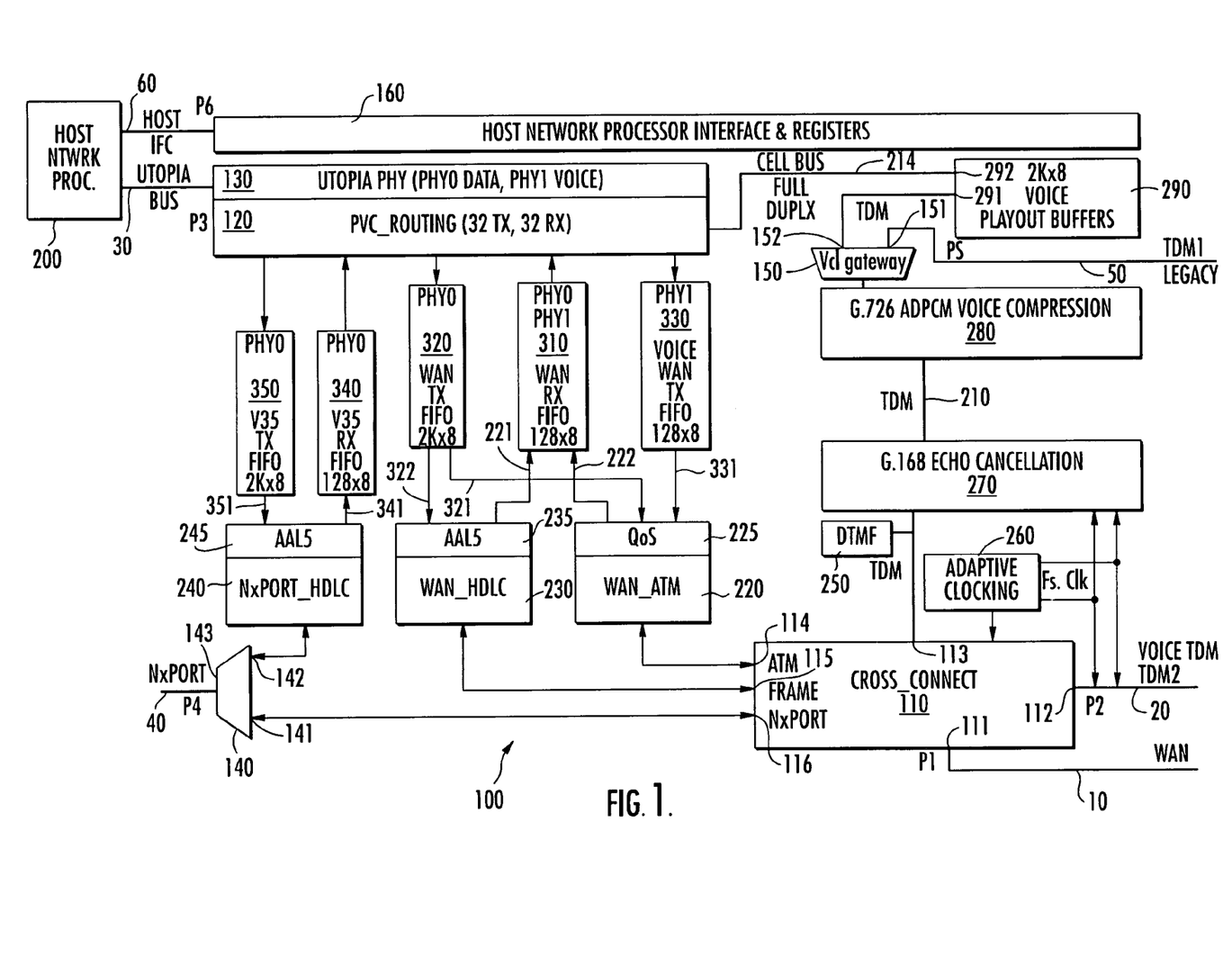
FIG. 1 diagrammatically illustrates the overall architecture of a non-limiting, but preferred, embodiment of the dual PHY-based integrated access device of the invention disclosed in the above-referenced '402 application.

In accordance with the invention disclosed in the '402 application, shortcomings of conventional IADs are effectively remedied by a 'DSP-less' IAD architecture, that is configured as a dual PHY-based signal transport application specific integrated circuit (ASIC), and is operative to provide significantly enhanced interfacing flexibility for multiple and diverse types of digital communication signaling. More particularly, as shown in FIG. 1, which diagrammatically illustrates the overall configuration of that architecture, the IAD disclosed in the '402 application comprises a multi-protocol communication interface (MCI) 100, and an associated host network processor 200.

The multi-protocol communication interface 100 performs digital communication signaling interface functions in accordance with supervisory control inputs supplied from the host network processor 200 by way of a generic, host processor interface 160. In order to provide signal transport and network processor control interconnectivity, the multi-protocol communication interface 100 contains a plurality of signaling interface ports P1-P6, of which ports P1-P5 interface digital communication signals with the host network processor 200 and various external communication paths, and port P6 of which interfaces control signals with the processor 200.

A first, wide area communication network port P1 terminates a wide area network (WAN) 10 with a first port 111 of a conventional bidirectional digital cross-connect switch (XCS) 110, and provides both ATM and high level data link control (HDLC) connectivity with the WAN 10. A second, voice TDM or TDM2 port P2 terminates a second port 112 of the digital cross-connect switch with a voice TDM circuit 20, and provides digital transport connection to various TDM communication transceivers, such as analog codecs and T1 (including fractional T1) transceivers. Port P2 may be configured as a conventional TDM mode port and supports standard TDM control parameters, including Frame Sync, transmit and receive clock and data signals. In addition, port P2 is coupled to an adaptive clocking unit 260, which is operative during ATM mode operational mode to adjust clock and frame sync to incoming cell delivery timing over an internal TDM bus 210 from a bidirectional voice gateway 150.

Installed within the internal TDM bus 210 is a cascaded arrangement of a TDM transport path-cascaded echo canceler 270 and ADPCM voice compression operator 280, which implement G.726 ADPCM voice compression and G.168 echo cancellation by operating directly on the TDM encoded voice stream. Producing a processed digitized voice signal stream in this manner relieves the host processor of having to use data bus cycles to download processed digitized voice samples. TDM bus 210 is also coupled to a dual tone multi-frequency detector (DTMF) unit 250, which contains a plurality of DTMF detectors that may be selectively dedicated to tone sensing functions for signaling operations on the TDM bus.

A third, UTOPIA port P3 terminates a dual UTOPIA L2 PHY interface 130 with a byte-wide, ATM cell-based UTOPIA bus 30. This bus serves as the main 'data' or communication signal transport path with the host network processor. The dual UTOPIA L2 PHY interface 130 and its associated UTOPIA bus 30 operate at a very high clocking frequency (on the order of 25 MHz, which equates to an enhanced data transport rate on the order of 200 MBps) relative to network and terminal rates (which have data rates on the order of only 1.5-2.0 Mbps (e.g., a WAN rate of 2304 kpbs)). As such, signaling transport communications between the multi-protocol communication interface 100 and the host network processor 200 are effectively quasi-instantaneous, so that participation by the host network processor in the transport of both digitized voice and data communication signals over any of the routing paths among the signaling ports of the multi-protocol communication interface will not burden (slow down) the operational speed of any of the external communication circuits to which the IAD is ported.

The dual UTOPIA L2 PHY interface 130 contains two separate physical layer (PHY) portions (PHY0 for data, and PHY1 for voice), each PHY layer being byte-wide and containing separate transmit (TX) and receive (RX) buses. The PHY1 portion is dedicated to voice signaling and has the higher priority of the two PHY portions. PHY0 (associated with data transport) is the lower priority of the two portions. The voice PHY portion (PHY1) of the dual UTOPIA L2 PHY interface 130 is used for voice ATM cell transfers between bidirectional voice playout buffers of a multi-channel voice playout buffer unit 290 and the host network processor 200, and for ATM voice cell transfers between the host network processor 200 and the WAN via a voice WAN FIFO 330. The data PHY portion (PHY0) of the dual UTOPIA L2 PHY interface 130 is used for data ATM cell transfers between the host network processor and sets of TX and RX data FIFOs, serving the WAN and an auxiliary V.35 circuit path.

A fourth, NxPORT P4 of the multi-protocol communication interface 100 terminates an external port 143 of a bidirectional multiplexer (mux/demux) 140 with an auxiliary (Nx56/64) digital communication path 40, over which non cell-based (e.g., V.35) digital communications are conducted with an auxiliary digital communication device. The fifth communication port P5 is a TDM legacy port, that terminates a first port 151 of the gateway 150 with a legacy voice TDM communication link 50. As pointed out above, gateway 150 provides TDM connectivity with a TDM bus 210 containing the TDM transport path-cascaded echo canceler 270 and ADPCM voice compression operator 280.

The TDM bus 210 is further coupled to TDM voice port 113 of bidirectional digital cross-connect switch (XCS) 110. This internal TDM voice interconnect path makes the multi-protocol communication interface compatible with legacy IAD architectures, such as those which employ a Motorola 860 processor. The TDM legacy port PS supports these architectures where TDM-IN and TDM-OUT interfacing are used. In such a legacy TDM mode, port PS is TDM-coupled to port P2, by-passing ATM signal processing paths that use dual UTOPIA L2 PHY interface 130 and UTOPIA bus 30 to the host network processor.

A second port 152 of the TDM voice gateway 150 is coupled over a link 212 to port 291 of bidirectional voice playout buffers of the multi-channel voice playout buffer unit 290. For the case of 32 voice channels, as a non-limiting example, the voice playout buffer unit 290 contains 32 channels of bidirectional first-in, first-out registers (FIFOs). All of these channels operate independently and concurrently. Each of these FIFOs is sized (e.g., has a 64 byte capacity) to store the voice payload of an ATM cell (44 bytes), as well as accommodate transport delay to and from the host network processor, and thereby allow for an effectively continuous interfacing/flow and conversion of TDM communication signals on the TDM bus 210 with ATM cells interfaced with dual UTOPIA L2 PHY interface 130 over a full duplex ATM cell bus 214 therebetween. The remaining port P6 of the multi-protocol communication interface terminates a control signal bus 60 with a generic, host processor interface (HPI) 160, through which control signals are interfaced with the HNP 200 for configuring and managing the functionality of the multi-protocol communication interface.

The digital cross-connect switch (XCS) 110, which may be of conventional construction, provides first and second external communication signaling port terminations 111/P1 and 112/P2 with the WAN 10 and voice TDM circuit 20, respectively. In addition to its two external ports 111 and 112, XCS 110 includes a third, TDM voice port 113, through which TDM voice circuit 20 is coupled to the internal TDM bus 210. XCS 110 has a fourth, ATM port 114, and a fifth, HDLC port 115, which respectively provide connectivity between the WAN port 111 and a WAN ATM transceiver 220, and a WAN HDLC transceiver 230. The digital cross connect switch 110 further includes a sixth, Nx port 116, that is coupled to a first internal port 141 of mux/demux 140. A second internal port 142 of mux/demux 140 is coupled to an NxPORT HDLC transceiver 240.

There are two modes of operation of the digital XCS 110: direct DS0-mapping mode; and ATM/HDLC transceiver interface mode. In DS0-mapping mode, the internal dual ATM PHY conversion and transport functionality of the MCI is effectively bypassed; instead, DS0 time slots on the voice TDM link 20 at port 112 are directly mappable to port 111 and WAN 10, based upon a user-controlled mapping scheme. In addition, DS0 time slots on the voice TDM link 20 at port 112 are directly mappable to the voice port 113, so that they may be coupled to the internal TDM bus 210. DS0 time slots at port 112 may also be directly mapped via port 116 to port 141 of Nx mux/demux 140 for Nx56/64 clear channel (V.35) operation. As noted above, DTMF detector unit 250 coupled to internal TDM bus 210 may be used to analyze DTMF and dial tone signals.

In ATM/HDLC transceiver interface mode, XCS 110 couples the WAN port 111 to the appropriate one of ATM and HDLC transceiver ports 114 and 115, which are respectively coupled to WAN ATM transceiver 220 and WAN HDLC transceiver 230. Considering first, ATM mode communications, in the receive direction (incoming from the WAN toward the network processor), the WAN ATM transceiver 220 is configured to interface, over an eight bit wide receive bus 222 to a receive (RX) FIFO 310, incoming ATM cells that have been coupled thereto via port 114 of XCS 110. As a non-limiting example, RX FIFO 310 may have a relatively small depth (e.g. 128 bytes, which accommodates two ATM cells or 106 bytes) due to the considerably higher speed of the UTOPIA L2 PHY bus. ATM cells supplied to RX FIFO 310 are output via a permanent virtual circuit (PVC) router 120 to the data (PHY0) portion of the dual UTOPIA L2 PHY interface 130, for transport over UTOPIA bus 30 to the network processor.

The PVC router 120 is preferably implemented using multibit table entries in internal memory to control or 'steer' the flow of ATM data cells of various virtual circuits within the MCI for voice and data signaling transport. For a 32 channel implementation, the PVC routing table supports 32 entries for transmit and 32 entries for receive, and specifies to/from which interface the ATM cell of interest is delivered. In a customary manner, PVC router 120 is configured to analyze the contents of a respective packet presented to it and then selectively route the packet to the appropriate output port based upon the results of that analysis.

For incoming ATM voice cells from the WAN 10, routing to the network processor is from the RX FIFO 310 to the PHY1 port of the dual UTOPIA L2 PHY interface 130, whereas transmitted WAN voice routing from the processor is from the PHY1 portion of dual PHY layer to the voice WAN FIFO 330. For incoming voice calls from the TDM2 network 20, routing is from the cell bus 214 serving the voice playout buffer unit 290 to the PHY1 portion of interface 130, whereas outgoing voice calls to the TDM2 network 20, routing is from the PHY1 portion of interface 130 over the cell bus 214 to the voice playout buffer unit 290.

For ATM data cells received via ATM transceiver 220 from the WAN 10, routing to the network processor is from the RX FIFO 310 to the PHY0 port of the dual UTOPIA L2 PHY interface 130, whereas transmitted WAN data routing from the processor is from the PHY0 portion of dual PHY layer to the WAN DTX FIFO 320 and to WAN ATM transceiver 220. For HDLC traffic received via HDLC receiver 230 from the WAN 10, routing to the network processor is from the RX FIFO 310 to the PHY0 port of the dual UTOPIA L2 PHY interface 130, whereas transmitted WAN data routing from the processor is from the PHY0 portion of the dual PHY layer to the WAN DTX FIFO 320 and to HDLC transceiver 230.

For incoming auxiliary V.35 routing, the PVC router 120 directs data entries in the V.35 RX FIFO 340 to the PHY0 portion of the dual UTOPIA L2 PHY interface 130; for outgoing auxiliary V.35 routing, PVC router 120 directs the AAL5 encapsulated data from the PHY0 portion of the dual UTOPIA L2 PHY interface 130 into the V.35 TX FIFO 350.

As described briefly above, the voice playout buffer unit 290 contains a plurality (32 in the present example) of voice channel-associated bidirectional FIFOs, each of which has a (64 byte) capacity that is sufficient to store a standard (44-byte) voice payload of a full ATM cell, while also providing extra capacity to accommodate expected worst case transport delay to and from the host network processor. This ensures effectively continuous interfacing/flow and conversion of TDM communication voice data on the TDM bus 210 with ATM cells that are interfaced with dual UTOPIA L2 PHY interface 130 over the full duplex ATM cell bus 214.

Figure 2:
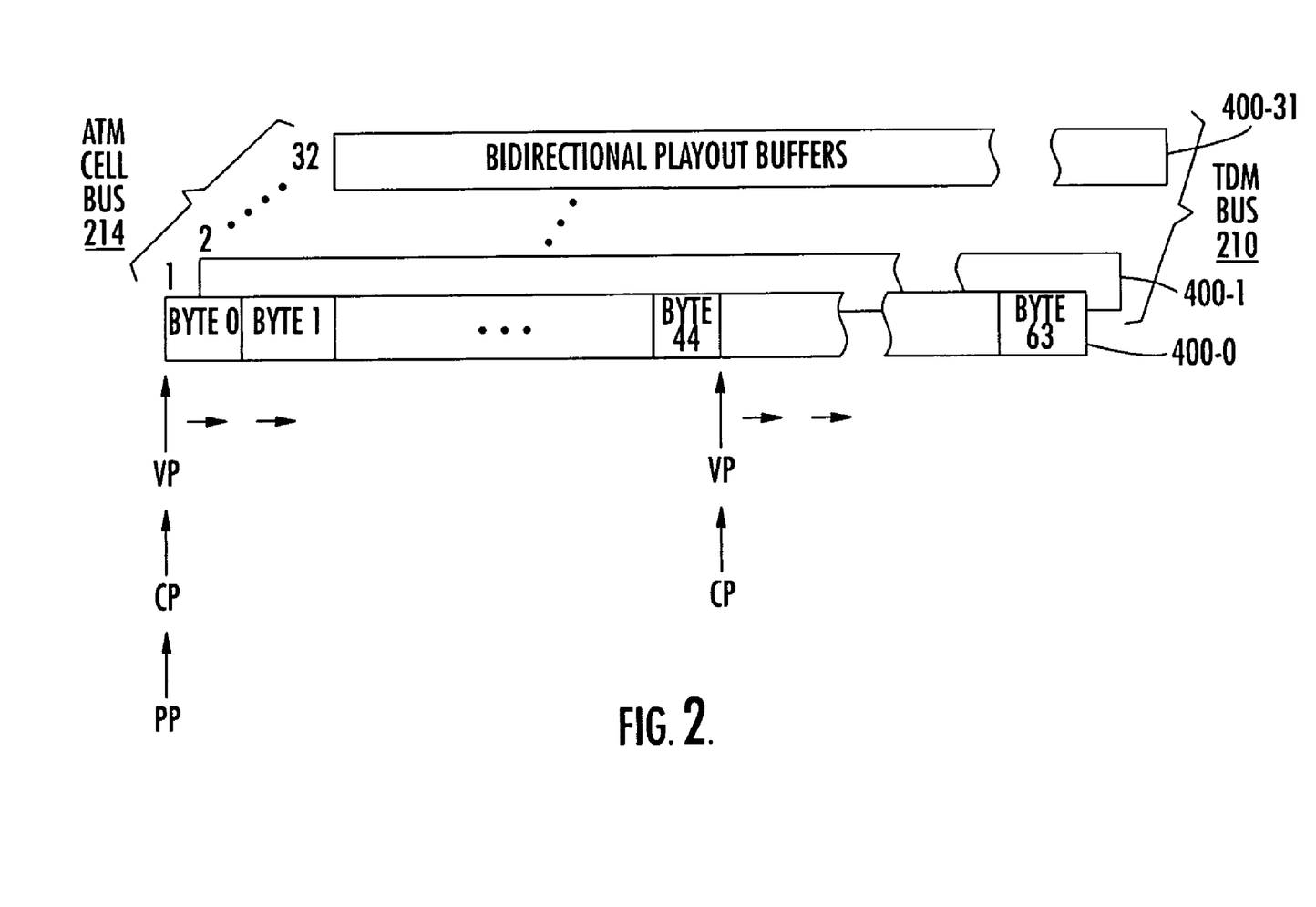
FIG. 2 diagrammatically illustrates a bidirectional playout buffer of the voice playout buffer unit of the multi-protocol communication interface of the IAD architecture of FIG. 1.

This may be understood by reference to FIG. 2, which diagrammatically illustrates an array of 32 (64 byte) bidirectional playout buffers 400-0, 400-1, ..., 400-31 that make up the voice playout buffer unit 290. For transmitting and receiving ATM cells via the full duplex ATM cell bus, a respective voice playout buffer 400-i is coupled to an ATM cell port 292. For interfacing TDM data with the TDM bus, a respective voice playout buffer 400-i is coupled to a TDM port 291.

In operation, for the flow of TDM voice traffic received from the TDM bus 210 (as sourced from the TDM2 port P2 that terminates port 112 of the digital cross-connect switch with voice TDM circuit 20), let it be initially assumed that all of the voice playout buffers 400-i are cleared or reset. As such, received TDM voice traffic from the TDM bus will be written into successive byte locations of a respective playout buffer 400-i, beginning with the lowermost or '0'th byte location (as pointed to by a (bit-oriented) voice pointer (VP)), which is incremented through successive storage locations of the voice playout buffer, at the rate of the received data clock.

As successively received TDM voice data is written into successive bytes/locations of respective voice playout buffer channels from the TDM bus, the voice pointer (VP) will eventually point to the 43rd byte location of the highest numbered channel for which data is stored. If all 32 channels have received voice data, this would correspond to byte 43 of buffer 400-31. If less than all 32 channels are used, this would correspond to the highest numbered channel. For example, if channel 31 contained voice data, the highest numbered buffer in use would be buffer 400-31; otherwise, if channel 31 is not used, the voice pointer would point to the 43rd byte of the highest numbered channel (channel 30 or less) for which voice data is stored. In response to the loading of the 44th byte into the highest numbered buffer for which data is stored, all channels are encapsulated with ATM headers as 53 byte ATM cells and then 'burst'-routed via PVC 120 and the dual PHY layer 130 to the host processor for delivery to a downstream WAN circuit.

The fact that each individual voice playout buffer 400-i has a sixty-four byte capacity means that, for a 44 byte data field of a respective 53 byte ATM cell, there is a twenty-byte window within which the host processor must return a response ATM voice packet for the POTS channel of interest. ATM encapsulation of a respective 44 byte data field includes a four byte ATM Adaptation Layer 2 (AAL2) header, a HEC byte and a four byte ATM header, to realize a standard 53 byte ATM cell. Within the AAL2 header, the channel identification byte (CID) byte may be made programmable, so as to provide selective mapping to timeslots of a TDM frame, and thereby accommodate variations among different vendor equipments.

In the return direction from the host processor, the ATM overhead bits are stripped off and the remaining 44 bytes of voice payload data are written into the successive locations of the playout buffer, as pointed to by a cell pointer (CP), beginning with the first byte of the 44 bytes that had just been burst out over the PHY bus to the processor. So long as the voice pointer (VP), which has been and continues to be incremented at the relatively slower TDM rate, has not reached the end (byte location 63) of the playout buffer and begun 'wrapping around' to the lowest byte location, and with the contents of the first 44 byte locations of the playout buffer having been read out to the processor and therefore stale, return voice cell data from the processor may be written into those same (stale data) byte locations (0-43) of the playout buffer from which the previous burst was received.

Thus, if the host processor has (and due to its considerably higher speed is expected to have) returned a response ATM voice cell containing 44 bytes of TDM data to the playout buffer, before the end of the twenty cell window of the playout buffer has been reached, there can expected to be some byte differential (one to twenty bytes, in the present example of a 64 byte capacity playout buffer) between the current location of the voice pointer (VP) and that of the cell pointer (CP). This flexibility offered by the practical size of the voice playout buffer greatly reduces the cost and complexity of the digitized voice transport path. Namely, as long as this 'turn-around' differential remains within the twenty byte window, continuity of voice packet flow (with no overflow and no underflow) will be effectively maintained throughout a call. If a return cell is not ready to send, the host processor will resend the last transmitted cell, to maintain continuous voice cell flow.

As further described in the '402 application, the voice playout buffer employs a single write interrupt, in order to optimize DMA transfer efficiency of as many playout buffers (up to 32) that currently have data for the host processor. Namely, at this single interrupt, all active channels (up to 32 channels in the present example) of ATM cell data are transferred into processor memory under DMA control. The use of a single interrupt successfully addresses a number of issues dealing with loading of the host network processor.

In a typical packetized voice cell transfer, the associated host processor would customarily be interrupted every time a voice packet is ready for transmission. For a thirty two channel voice playout buffer, this would result in 32 interrupts to handle all 32 channels. The interrupt handler would then transfer responsibility for the voice packet to a resident software task. A significant problem with this approach is the fact that the processor is interrupted on a per-voice packet basis. Another problem is the need to handle each individual voice packet by a software task. These requirements entail a substantial consumption of host processing power, which could be used elsewhere to improve overall system performance.

SUMMARY OF THE INVENTION

The present invention is directed to a mechanism for implementing the single interrupt-based voice playout buffer transfer operation referenced in the '402 application. As will be described, the contents of each respective channel of the voice playout buffer are encapsulated so as to prepend a four byte AAL2 header, a HEC byte and a four byte ATM header to a forty-four byte voice field to realize a standard fifty-three byte ATM cell. Within the AAL2 header, the channel identification byte (CID) byte provides selective mapping to timeslots of a TDM frame, to accommodate variations among different vendor equipments. The next to last bit of the last byte of the ATM header is used as an interrupt to the network processor. Only the highest voice channel asserts this last bit as an interrupt bit.

For this purpose, the voice playout buffer contains an ATM cell encapsulation logic unit, which is configured to perform two header prepending operations. A first involves assembling a four byte AAL2 header, which incorporates a channel identification field that associates a respective ATM cell with a respective channel among the multi-channel capacity of the voice playout buffer. A second involves assembling a four byte ATM header, the next to last bit of the last field of which is logically marked to indicate whether that cell is the last cell in a frame of cells. Namely, the next to last bit serves as an interrupt bit, for selectively interrupting the host network processor.

This means that for every voice channel other than the highest numbered voice channel, the next to last bit of the four byte ATM header will be set to a first prescribed logical state (e.g., '0'), informing the network processor that this particular ATM cell is not the last cell of the frame, so that the processor will not be interrupted by that particular ATM cell. Only the next to last ATM header bit for the highest numbered voice channel for which voice data has been buffered in the voice playout buffer will be set to a second prescribed logical state (e.g., '1'), so that the network processor will be advised that this particular cell is the last ATM cell, causing the processor to be interrupted only by that particular ATM cell. In this manner, the processor will be interrupted only once per ATM cell group or frame basis by the highest or 'last' ATM cell in the ATM frame.

An additional benefit provided by the header encapsulation mechanism of the invention involves the prepending of the four byte AAL2 header upstream of the software driver that resides in the host network processor. Since the AAL2 header is prepended to the ATM cell's voice channel data at the source (the voice playout buffer), it is unnecessary for the software driver within the network processor to forward the data to an internal AAL2 processing mechanism for the purpose. Instead, each ATM cell, whose CID field associates each channel with a respective time slot, may be directly forwarded to the network 'as is'.

DETAILED DESCRIPTION

Before detailing the single interrupt-based, multi-channel ATM voice cell transfer mechanism according to the present invention, it should be observed that the invention resides primarily in a prescribed arrangement of conventional digital communication circuits and components, and an attendant host communications microprocessor, and application software therefor, that controls the operations of such circuits and components. In a practical implementation, the invention may be readily constructed of field programmable gate array (FPGA)-configured, digital application specific integrated circuit (ASIC) chip sets. Consequently, in the drawings, the configuration of such circuits and components, and the manner in which they are interfaced with various communication circuits have, for the most part, been illustrated by readily understandable block diagrams, which show only those specific details that are pertinent to the present invention, so as not to obscure the disclosure with details which will be readily apparent to those skilled in the art having the benefit of the description herein. Thus, the block diagrams of the Figures are primarily intended to show the various components of the invention in convenient functional groupings, so that the present invention may be more readily understood.

Figure 3:
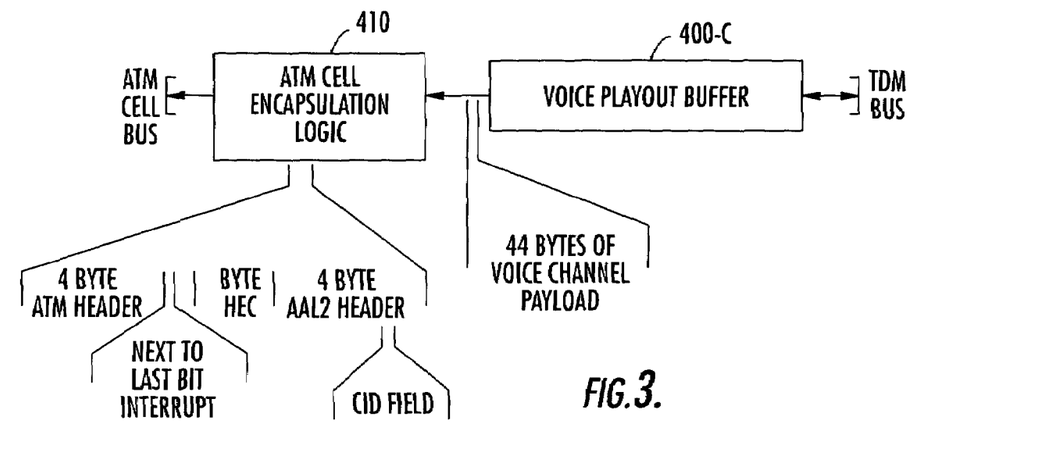
FIG. 3 diagrammatically illustrates the manner in which the contents of a respective voice playout buffer are encapsulated pursuant to the ATM cell transport protocol of the invention.

Attention is now directed to FIG. 3, which diagrammatically illustrates the manner in which the contents of a respective voice playout buffer 400-i are encapsulated pursuant to the ATM cell transport protocol of the invention for transmission over the PHY1 layer (voice channel layer) of the UTOPIA bus to the host network processor. It is to be understood that the encapsulation mechanism of FIG. 3 is replicated for each of the channels (32 in the present example) of the overall capacity of the voice playout buffer unit. As shown therein, and as described above, ATM encapsulation of a respective 44 byte data field by the PVC router 120 includes a four byte AAL2 header, a HEC byte and a four byte ATM header, to realize a standard 53 byte ATM cell. Within the AAL2 header, the channel identification byte (CID) may be made programmable, so as to provide selective mapping to timeslots of a TDM frame, and thereby accommodate variations among different vendor equipments.

To this end the voice playout buffer contains an ATM cell encapsulation logic unit 410, which is configured to perform two header prepending operations. A first involves assembling a four byte AAL2 header, which incorporates a channel identification field or CID, that associates a respective ATM cell with its associated channel among the (32 channel) capacity of the voice playout buffer. A second involves assembling a four byte ATM header, the next to last bit of the last field of which is logically marked to indicate whether that cell is the last cell in a frame of cells. In effect, therefore, the ATM header uses its next to last bit to perform the function of an interrupt bit, for selectively interrupting the host network processor.

Namely, in accordance with the present invention, for every one of the (32) voice channels other than the highest numbered voice channel for which voice data has been buffered in the voice playout buffer, the next to last (interrupt representative) bit of the four byte ATM header is set to a first prescribed logical state (e.g., '0'), informing the network processor that this particular ATM cell is not the last cell of the frame, so that the processor will not be interrupted by that particular ATM cell. On the other hand, the next to last ATM header bit for the highest numbered voice channel for which voice data has been buffered in the voice playout buffer will be set to a second prescribed logical state (e.g., '1'), so that the network processor will be advised that this particular cell is the last ATM cell, causing the processor to be interrupted by that particular ATM cell. In this manner, the processor will be interrupted only on a per ATM cell group or frame basis by the highest or 'last' ATM cell in the ATM frame.

The smallest number of ATM cells of which an ATM frame may be comprised is one—corresponding to only a single voice channel. Obviously, for only a single channel, the interrupt mechanism described above is reduced to that of a conventional and inefficient one interrupt for each channel operation. In a practical environment, however, the voice playout buffer can be expected to be concurrently handling a plurality of independent voice channels, rather than only a single channel. The largest number of ATM cells that may comprise an ATM frame is the channel capacity of the voice playout buffer (32 in the present example). It will be readily appreciated that the processor load-relieving benefit provided by the present invention increases as the number of voice channels increases.

Figure 4:
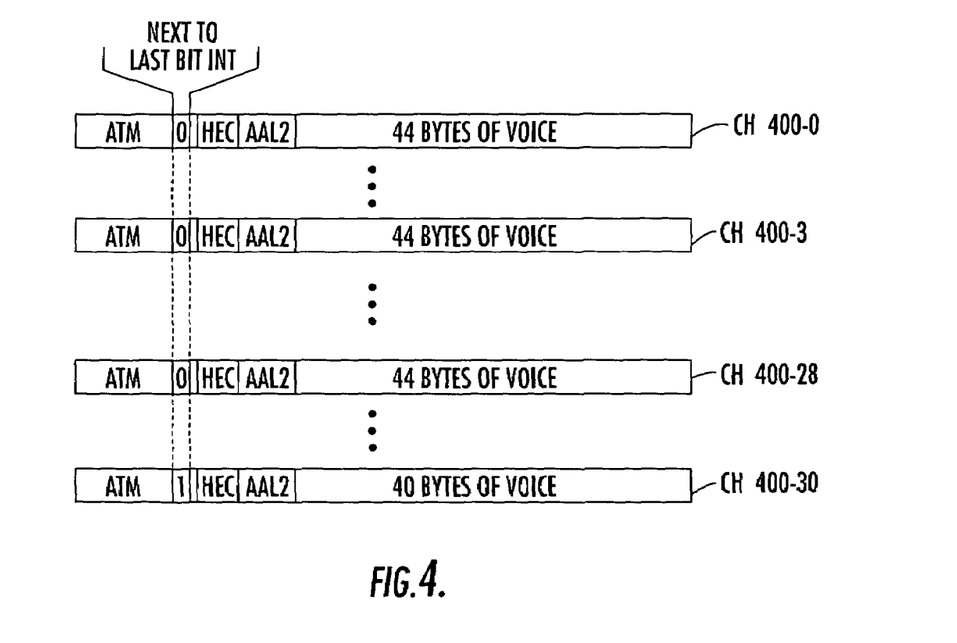
FIG. 4 is a reduced complexity illustration of the single interrupt per ATM cell-encapsulated voice channel frame for a four-channel frame.

FIG. 4 is a reduced complexity illustration of the above-described single interrupt per ATM cell-encapsulated voice channel frame for a four-channel frame comprised of four arbitrary voice channels, identified as channels 400-0, 400-3, 400-28 and 400-30 within the 32 channel capacity voice playout buffer of the present example.

In the course of prepending each of the voice channel cells with a four byte ATM header, a HEC byte, and a four byte AAL2 header, the ATM cell encapsulation logic will specify within the interrupt bit containing field (the next to last bit of the four byte ATM header) whether or not that cell is the last cell of the frame, namely, whether the processor is to be interrupted by that particular ATM cell by the appropriate setting of the interrupt bit. Since none of the first three channels 400-0, 400-3 and 400-28 is the highest numbered channel of the four channel ATM cell frame, the interrupt bit of the ATM header will be set to zero, as shown. The fourth channel (channel 400-30) is the highest numbered channel (namely, the last channel) of the four ATM cell frame; therefore its interrupt bit will be set to or 'marked' with a '1', as shown. Thus, the processor will not be interrupted until it has received a complete frame of ATM-encapsulated voice channels as identified by the 'marked last' or highest number channel cell.

As pointed out above, the interval encompassed by a frame of voice cells corresponds to the transport time for 44 bytes in a frame transport mode for up to 32 channels per frame. At a data transport interval of 125 microseconds per byte as dictated by the voice TDM communication link 20, the effective voice cell interval is 5.5 milliseconds per 44 byte frame. As noted previously, the dual UTOPIA L2 PHY interface 130 and its associated UTOPIA bus 30 operate at a very high clocking frequency (on the order of 25 MHz, which equates to an enhanced data transport rate on the order of 200 MBps) relative to network and terminal rates (which have data rates on the order of only 1.5-2.0 Mbps (e.g., a WAN rate of 2304 kpbs)). As such, voice channel transport communications between the voice playout buffer and the host network processor are effectively quasi-instantaneous.

An additional benefit provided by the header encapsulation mechanism of the invention involves the prepending of the four byte AAL2 header upstream of the software driver that resides in the host network processor. Since the AAL2 header is prepended to the ATM cell's voice channel data at the source (the voice playout buffer), it is unnecessary for the software driver within the network processor to forward the data to an internal AAL2 processing mechanism for the purpose. Each ATM cell, whose CID field associates each channel with a respective time slot, may be directly forwarded to the network 'as is'.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed:

1. A digital telecommunication apparatus comprising:
   a host network processor configured to be coupled to data terminal equipment;
   a multi-protocol communication interface, which is operative to execute diverse types of digital communication signaling interface functions with a plurality of communication ports, under the control of supervisory control signals supplied by said host network processor, said plurality of communication ports including a first port configured to interface ATM cell-based voice and data traffic with a digital communication network, a second port configured to interface TDM voice communication signals with a time division multiplexed (TDM) digitized voice communication link, and a third port configured to be coupled with a dual PHY ATM cell-based communication path over which ATM cell-based communications containing communication signals interfaced at said first and second ports are conducted between said multi-protocol communication interface and said host network processor;
   said multi-protocol communication interface includes a bidirectional digital cross-connect switch coupled to said second port, and providing TDM voice signaling connectivity between said second port and an internal TDM bus, said internal TDM bus being coupled with said dual PHY ATM cell-based communication path in such a manner as to interface TDM voice signals at said second port as ATM cell-based voice communications over said dual PHY ATM cell-based communication path with said host network processor;
   said bidirectional digital cross-connect switch is further coupled to said first port, and wherein said multi-protocol communication interface is configured to interface ATM cell-based voice communications received over said dual PHY ATM cell-based communication path from said host network processor through said bidirectional digital cross-connect switch with said first port for application to said digital communication network; and
   a cell encapsulation logic unit configured to perform header prepending operations.

2. The digital communications apparatus according to claim 1, wherein cell encapsulation unit performs first and second header prepending operations.

3. The digital communications apparatus according to claim 2, wherein said first header prepending operation assembles a four byte ATM Adaptation Layer 2 (AAL2) header.

4. The digital communications apparatus according to claim 3, wherein said four byte AAL2 header incorporates a channel identification field or CID.

5. The digital communications apparatus according to claim 2, wherein said second header prepending operation assembles a four byte ATM header.

6. The digital communications apparatus according to claim 3, wherein a next to last bit comprises an interrupt bit that selectively interrupts the host network processor.

7. A digital telecommunication apparatus comprising:
   a host network processor configured to be coupled to data terminal equipment;
   a multi-protocol communication interface, which is operative to execute diverse types of digital communication signaling interface functions with a plurality of communication ports, under the control of supervisory control signals supplied by said host network processor, said plurality of communication ports including a first port configured to interface ATM cell-based voice and data traffic with a digital communication network, a second port configured to interface TDM voice communication signals with a time division multiplexed (TDM) digitized voice communication link, and a third port configured to be coupled with a dual PHY ATM cell-based communication path over which ATM cell-based communications containing communication signals interfaced at said first and second ports are conducted between said multi-protocol communication interface and said host network processor;

said multi-protocol communication interface includes a bidirectional digital cross-connect switch coupled to said second port, and providing TDM voice signaling connectivity between said second port and an internal TDM bus, said internal TDM bus being coupled with said dual PHY ATM cell-based communication path in such a manner as to interface TDM voice signals at said second port as ATM cell-based voice communications over said dual PHY ATM cell-based communication path with said host network processor;

said internal TDM bus is coupled with a voice gateway having a first, TDM legacy port for providing access to a TDM voice legacy circuit, and having a second, TDM throughput port coupled with a full duplex digitized voice signal playout buffer unit that is operative to interface TDM voice signals transported by said internal TDM bus as ATM-cell based voice communications over said dual PHY ATM cell-based communication path with said host network processor; and a cell encapsulation logic unit configured to perform header prepending operations.

8. The digital communications apparatus according to claim 7, wherein cell encapsulation unit performs first and second header prepending operations.

9. The digital communications apparatus according to claim 8, wherein said first header prepending operation assembles a four byte ATM Adaptation Layer 2 (AAL2) header.

10. The digital communications apparatus according to claim 9, wherein said four byte AAL2 header incorporates a channel identification field or CID.

11. The digital communications apparatus according to claim 8, wherein said second header prepending operation assembles a four byte ATM header.

12. The digital communications apparatus according to claim 11, wherein a next to last bit comprises an interrupt bit that selectively interrupts the host network processor.

13. A digital telecommunication apparatus comprising:

a first port configured to be coupled to a digital communication network;

a second port configured to be coupled to a time division multiplexed (TDM) digitized voice communication link;

a third port configured to be coupled with a cell-based communication path, over which cell-based digital communications are conducted with a host processor; and a multi-protocol communication interface coupled to said first, second and third ports, and being operative to interface digital communication signal traffic received at said first port and TDM digitized voice signal traffic received at said second port, as cell-based digital communication signals for application to said third port and transport therefrom over said cell-based communication path to said host processor, and to interface each of cell-based digital communication signal traffic and cell-based digitized voice communication signals, received at said third port from said host processor via said cell-based communication path, and destined for delivery to a communication circuit served by said digital communication network, as digitized communication signals for application from said first port to said digital communication network wherein said multi-protocol communication interface further includes a digital communication network-to-TDM voice communication link transport path, which is operative to interface digitized voice signals, received at said first port from said digital communication network and destined for delivery to a voice signaling circuit served by said TDM voice communication link, with said third port and transport therefrom as cell-based digitized voice signals over said cell-based communication path to said host processor, and to interface cell-based digitized voice signals, supplied to said third port over said cell-based communication path from said host processor and destined for delivery to said voice signaling circuit served by said TDM voice communication link, as TDM digitized voice signals for application from said second port and transport via said TDM voice communication link to said voice signaling circuit; and a cell encapsulation logic unit configured to perform header prepending operations.

14. The digital communications apparatus according to claim 13, wherein cell encapsulation unit performs first and second header prepending operations.

15. The digital communications apparatus according to claim 14, wherein said first header prepending operation assembles a four byte ATM Adaptation Layer 2 (AAL2) header.

16. The digital communications apparatus according to claim 15, wherein said four byte AAL2 header incorporates a channel identification field or CID.

17. The digital communications apparatus according to claim 14, wherein said second header prepending operation assembles a four byte ATM header.

18. The digital communications apparatus according to claim 17, wherein a next to last bit comprises an interrupt bit that selectively interrupts the host network processor.

* * * * *

UNITED STATES PATENT AND TRADEMARK OFFICE
CERTIFICATE OF CORRECTION

PATENT NO. : 7,545,828 B2  Page 1 of 1
APPLICATION NO. : 10/408590
DATED : June 9, 2009
INVENTOR(S) : Phillip Stone Herron It is certified that error appears in the above-identified patent and that said Letters Patent is hereby corrected as shown below:

| | |
|---|---|
| Column 3, Line 32 | Delete: "PS"<br>Insert: --P5-- |
| Column 3, Line 34 | Delete: "PS"<br>Insert: --P5-- |
| Column 10, Line 61<br>Claim 6 | Delete: "3"<br>Insert: --5-- |

Signed and Sealed this

Twenty-third Day of March, 2010

David J. Kappos
*Director of the United States Patent and Trademark Office*